US012302078B2

(12) United States Patent
Seebauer

(10) Patent No.: US 12,302,078 B2
(45) Date of Patent: May 13, 2025

(54) COIL

(71) Applicant: GRAWE & SCHNEIDER GDBR, Kiefersfelden (DE)

(72) Inventor: Christian Seebauer, Nittenau (DE)

(73) Assignee: GRAWE & SCHNEIDER GDBR, Kiefersfelden (DE)

( * ) Notice: Subject to any disclaimer, the term of this patent is extended or adjusted under 35 U.S.C. 154(b) by 67 days.

(21) Appl. No.: 17/922,370

(22) PCT Filed: May 12, 2021

(86) PCT No.: PCT/EP2021/062742
§ 371 (c)(1),
(2) Date: Oct. 30, 2022

(87) PCT Pub. No.: WO2021/229011
PCT Pub. Date: Nov. 18, 2021

(65) Prior Publication Data

US 2023/0217180 A1 Jul. 6, 2023

(30) Foreign Application Priority Data

May 13, 2020 (DE) ..................... 10 2020 112 950.5

(51) Int. Cl.
*H04R 9/04* (2006.01)
*H04R 3/00* (2006.01)
*H04R 9/06* (2006.01)

(52) U.S. Cl.
CPC ............... *H04R 9/047* (2013.01); *H04R 3/00* (2013.01); *H04R 9/06* (2013.01)

(58) Field of Classification Search
CPC ............. H04R 9/047; H04R 3/00; H04R 9/06
USPC .................................................. 381/117, 111
See application file for complete search history.

(56) References Cited

U.S. PATENT DOCUMENTS

| | | | |
|---|---|---|---|
| 3,209,084 A | 9/1965 | Gamzon | |
| 8,879,756 B2 | 11/2014 | Kim | |
| 2015/0110334 A1 | 4/2015 | Colich et al. | |
| 2019/0326501 A1* | 10/2019 | Gilbert | C04B 35/45 |

FOREIGN PATENT DOCUMENTS

| | | |
|---|---|---|
| DE | 3110278 | 9/1982 |
| JP | S55179491 | 12/1980 |
| JP | S5668098 | 6/1981 |

* cited by examiner

*Primary Examiner* — Thjuan K Addy
(74) *Attorney, Agent, or Firm* — Crose Law LLC; Bradley D. Crose

(57) ABSTRACT

Coil, preferably for driving a loudspeaker, comprising a printed circuit board and at least two windings formed as conductors, wherein the conductors have different widths.

12 Claims, 3 Drawing Sheets

COIL

Figure 1:
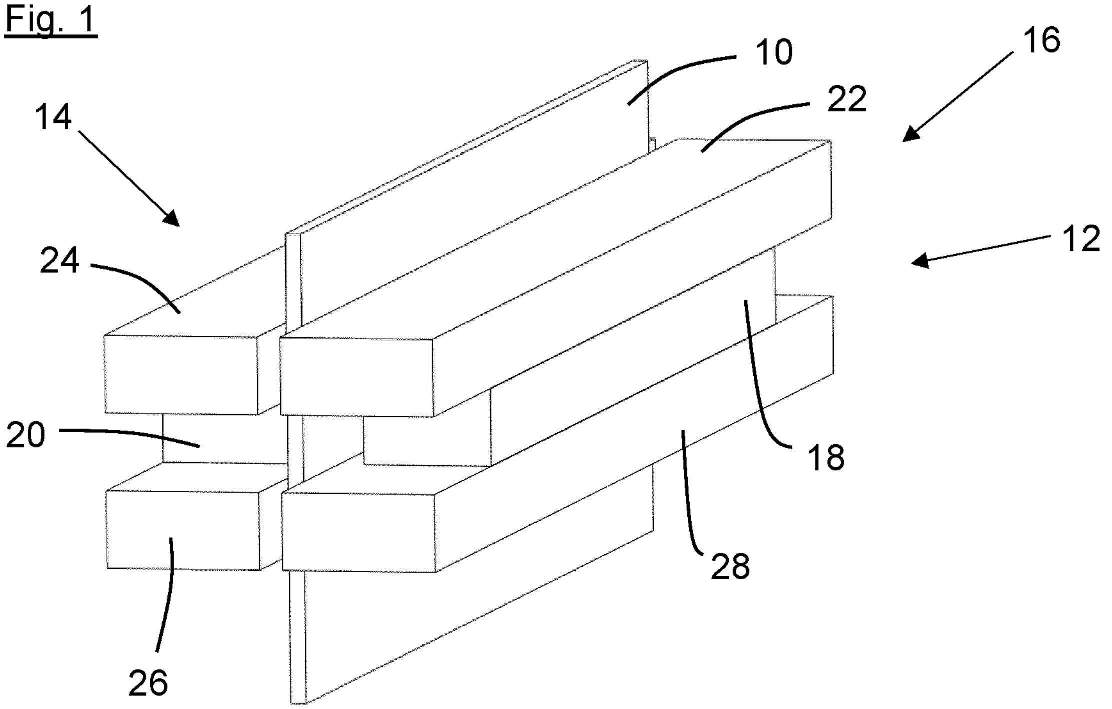

The invention relates to a coil, preferably for driving a loudspeaker, comprising a printed circuit board and at least two windings formed as conductors.

A planar loudspeaker is known from DE 10 2018 124 261 A1, which comprises a flat sound panel and a drive unit for driving the sound panel. The drive unit has a plate-shaped coil carrier with a coil formed thereon and a magnet device. The coil carrier is arranged in a gap between two magnet units of the magnet device The drive unit is designed, for example, to cause the sound panel to vibrate in order to generate sound. Preferably, the drive unit is designed as an electrodynamic drive. For example, a current-carrying conductor can then be held in a magnetic field. This exerts a force on the sound panel connected to the drive unit.

Loudspeakers should reproduce sounds as undistorted as possible. This objective is hindered by distortions that occur. One of the main causes of distortion in electrodynamic loudspeakers is the non-linearity of the so-called force factor for different voice coil deflections. The force factor (Bl) relates the current applied to the voice coil to its generated force.

The Lorentz force is $$\vec{F}=\int_V \vec{B}\times\vec{J}\,dV$$

with the magnetic flux density B, the current density J and the volume V. The force factor Bl in the undeflected state of the coil is $$Bl=\frac{\vec{e_z}\cdot\vec{F}}{I}=\frac{F_z}{I}$$

with the current I and the unit vector e, where z corresponds to the direction of movement of the voice coil.

In order to exclude non-linear ranges, previous coils have been designed comparatively high in order to be able to achieve a linear range of the force factor. This is particularly disadvantageous for planar loudspeakers, where the lowest possible construction is important.

It is therefore a task of the invention to create a coil and a method for manufacturing a coil which has a low construction.

This task is solved by the objects/methods of the independent claims.

The coil is preferably designed to drive a loudspeaker. The loudspeaker can be, for example, a planar loudspeaker or a funnel-shaped or cone-shaped loudspeaker.

The coil is preferably arranged in a magnetic field. A current flow in the coil causes the coil to deflect due to the Lorentz force.

The coil has a printed circuit board. The term printed circuit board is to be understood broadly in this context and, in addition to a circuit board or plate, also includes cut, stamped and/or beam-cut, preferably laser- or water-jet-cut, coil bodies. The printed circuit board may preferably comprise or consist of a plastic material.

The length of the printed circuit board can be, for example, between 1 cm and 30 cm, preferably between 3 cm and 20 cm, e.g. 15 cm.

The width of the printed circuit board can be, for example, between 0.5 cm and 20 cm, preferably between 2 cm and 10 cm, e.g. 5 cm.

The thickness of the printed circuit board may be, for example, between 0.1 mm and 10 mm, preferably between 1 mm and 5 mm, e.g. 2 mm.

The coil has at least two windings formed as conductors. The term "conductors" is to be understood broadly and includes wires and material depositions, e.g. chemical vapour depositions, as well as material depositions, e.g. punchings as used in punched coils.

The conductors can preferably comprise or consist of a metal material, e.g. copper and/or aluminium.

The conductors can preferably be applied directly to the printed circuit board. This enables an extremely compact design of the coil. Furthermore, in contrast to a conventional, mechanically wound coil, it is possible to design the shape and/or the arrangement of the conductors almost arbitrarily. The coils according to the invention are also significantly cheaper to manufacture.

The conductors are wound in a spiral from the inside to the outside. The length of the conductors increases from the inside to the outside.

The length of the conductors, i.e. half a winding, can be for example between 1 cm and 30 cm, preferably between 2 cm and 20 cm, e.g. between 10 cm and 15 cm.

The width of the conductive tracks can be, for example, between 0.05 mm and 10 mm, preferably between 0.5 mm and 5 mm, e.g. 1 or 2 mm. The tracks can be e.g. 0.1 mm, 0.2 mm or 0.3 mm wide.

According to the invention, the conductors have different widths. Consequently, one conductor is wider than the other.

Preferably, one conductor may be at least twice, three times, four times, five times, six times, seven times, eight times, nine times or ten times as wide as the other.

For example, one conductor may have a width of 0.5 mm, while the other may have a width of 5 mm.

The different widths of the conductors lead to different current densities. The narrower a conductor, the higher the current density.

This allows non-linear areas to be compensated. The coil can thus be used over its entire width, which makes a compact design possible.

In the longitudinal direction, the widths of the respective conductors are preferably constant. In the deflection areas, the widths can also vary, for example, within a conductor.

The conductors can be V-shaped at the deflection areas, for example. The two legs can form an angle of between 90° and 150°, for example 120°. The corner areas can preferably be rounded to create a smooth transition.

Further designs of the invention can also be found in the dependent claims, the description and the accompanying drawings.

According to one design, the widths of the conductors are chosen in such a manner that the force factor of the coil is linearised in a magnetic field.

The widths of the conductors are thus not uniform, but individually adapted to the respective conditions.

This results in no or only slight non-linear distortions for a given coil height.

The coil is deflected essentially linearly in a magnetic field.

According to another design, a large number of conductors are provided, whereby the widths of the conductors vary unevenly from the centre of the coil to the outside.

The widths of the conductors thus do not increase evenly. The conducts thereby do not become linearly wider from the inside to the outside. Furthermore, the conductors do not become linearly narrower from the inside to the outside.

Rather, there is a non-linear change from the inside to the outside, e.g. an increase and/or decrease of the widths.

For example, the widths of the conductors can first increase and then decrease from the inside to the outside.

For example, at least 2, 3, 4, 5, 6, 7, 8, 9 or 10 windings can be provided per printed circuit board. More than ten windings, for example 11, 12, 13, 14, 15, 16, 17, 18, 19, 20 or more, are also possible.

If there are more than two conductors, the widths of at least two conductors are different. For example, all conductors may also have different widths.

According to a further design, the widths of the conductors are smaller at an inner area than at a central area, whereby the inner area is arranged closer to the coil centre than the central area.

The inner conductors are therefore narrower than conductors further away from the coil centre.

In another design, the widths of the conductors at an outer region are smaller than at a central region, whereby the central region is arranged closer to the coil centre than the outer region.

Accordingly, the outer conductors are narrower than the conductors closer to the centre of the coil.

Preferably, the widths of the conductors first increase from the inside to the outside and then decrease again.

In another design, multiple layers of printed circuit boards are provided. For example, 2, 3, 4, 5, 6, 7, 8, 9, 10, 11, 12, 13, 14, 15, 16, 17, 18, 19 or 20 layers can be provided. More than 20 layers are also possible.

The layers can preferably be arranged in parallel to each other. For example, the current can vary from layer to layer.

The layers can be used, for example, to optimise the efficiency of the voice coil and/or to achieve a desired impedance without affecting other design features.

The coil is preferably symmetrical. This simplifies the manufacture.

In another design, the widths of the conductors are selected in such a way that, in a magnetic field, a range of the deflection of the coil in which the quotient of a force factor and a force factor at a zero deflection deviates from the value 1 at most by a predetermined relative deviation is larger than in a coil with constant widths of the conductors.

The force factor corresponds to the volume integral over the cross product of the magnetic flow density and the current density, divided by the current flow.

If the coil is deflected, the force factor can assume values that differ from the force factor at zero deflection. Therefore, the quotient of the force factor in the deflected state and the force factor at zero deflection can also be unequal to the value 1. A relative deviation can be defined as a boundary condition. This corresponds to the maximum deviation from the value 1.

The relative deviation can be, for example, 30%, 25%, 20%, 15%, 10%, 5%, 4%, 3%, 2% or 1%. For example, a range of values between 1.3 and 0.7 can be defined as the deviation.

The range in which the quotient of the force factor in the deflected state and the force factor at zero deflection deviates from the value 1 by a maximum of a predetermined relative deviation, e.g. 30%, is larger in the coil according to the invention than in a coil with constant widths of the conductors.

In the case of a coil with constant widths of the conductor, the quotient of the force factor in the deflected state and the force factor at zero deflection deviates more strongly from the value 1, so that the predetermined maximum deviation is only maintained in a comparatively small range of the deflection of the coil.

Preferably, the widths of the conductors are selected in such a way that the range of the deflection of the coil is increased with a defined relative deviation of the force factor to the force factor at zero deflection, compared to a coil with constant conductor widths.

The widths of the conductors are preferably selected in such a way that in a magnetic field, irrespective of a movement of the coil, the volume integral over the cross product of the magnetic flow density and the current density, starting from a zero deflection of the coil, remains over a larger range within a predetermined maximum relative deviation than in the case of a coil with constant current density.

The movement of the coil is preferably in the z-direction. At zero deflection, the coil is centred. If the coil is now deflected upwards or downwards, the normalised force factor remains $$\frac{Bl}{Bl(D=0)}$$

(D=0 stands for zero deflection) within a given deviation over a larger range than with a coil in which the current density is constant.

The range in the z-direction in which the relative deviation is only a maximum of 10% can extend from, for example, −5 mm to 5 mm in a coil according to the invention. In a conventional coil with constant current density, the corresponding range can be significantly smaller and extend, for example, only from −3 mm to 3 mm.

For example, the widths of the conductors are selected in such a way that in a magnetic field, regardless of a movement of the coil, the volume integral over the cross product of the magnetic flow density and the current density, starting from a zero deflection of the coil, has a smaller deviation over a larger range than a coil with constant current density.

Preferably, the widths of the conductors are selected in such a way that the volume integral over the cross product of the magnetic flow density and the current density is essentially as constant as possible in a magnetic field irrespective of a movement of the coil.

The widths of the conductors are preferably chosen in such a way that the force factor is as linear as possible for the given boundary conditions.

The invention also relates to the use of a coil according to the invention for a loudspeaker, preferably a planar loudspeaker. The coil can also be used for a funnel-shaped or cone-shaped loudspeaker.

The invention further relates to a loudspeaker, e.g. planar loudspeaker or a funnel- or cone-shaped loudspeaker, with at least one coil according to the invention. For example, several coils, e.g. two, three, four, five, six or more, may be used.

The loudspeaker may preferably have a sound panel, e.g. flat, and at least one drive unit for driving the sound panel. The drive unit has a coil and a magnet unit. The coil carrier is arranged in a gap between two magnet units of the magnet device.

The drive unit is designed, for example, to cause the sound panel to vibrate in order to generate sound. Preferably, the drive unit is designed as an electrodynamic drive. When current flows through the coil, it is deflected in the magnetic field due to the Lorentz force. This exerts a force on the sound panel connected to the drive unit.

In a funnel- or cone-shaped loudspeaker, the coil can preferably be curved, e.g. cylindrical. A diaphragm, for example, may be used as the sound panel.

Finally, the invention relates to a method for producing a coil, preferably according to the invention, in which at least two windings of different widths, formed as conductors, are applied to a printed circuit board.

Since the conductors are applied to a printed circuit board, the shape of the conductors is extremely variable compared to conventional coils, which are wound mechanically.

In one design, a computer-aided optimisation method is used to calculate the widths of the conductors, whereby the widths are preferably optimised to that effect that the force factor of the coil is linearised in a magnetic field.

For example, a so-called "surrogate optimisation" can be used, in which a global minimum is searched for using predetermined parameters.

Furthermore, techniques such as big data and/or artificial intelligence can be used for optimisation.

In practice, parameters such as the dimensions of the printed circuit board, the number of tracks and/or the number of layers are predefined for the programme. The optimisation procedure then calculates the shape, preferably the widths, of the conductors. The widths are calculated in such a way that the force factor of the coil in a magnetic field is as linear as possible. Non-linear behaviour of the coil in the magnetic field is thus kept low.

Alternatively or additionally, optimisations are also possible with regard to heat development and/or load capacity.

Finally, the invention relates to the use of optimisation procedures for calculating the width of conductors of a coil.

All designs and components of the device described herein are preferably adapted to be manufactured according to the method described herein. Furthermore, all designs of the devices described herein as well as all designs of the method described herein can be combined with each other, preferably also detached from the specific design in the context of which they are mentioned.

Figure 2:
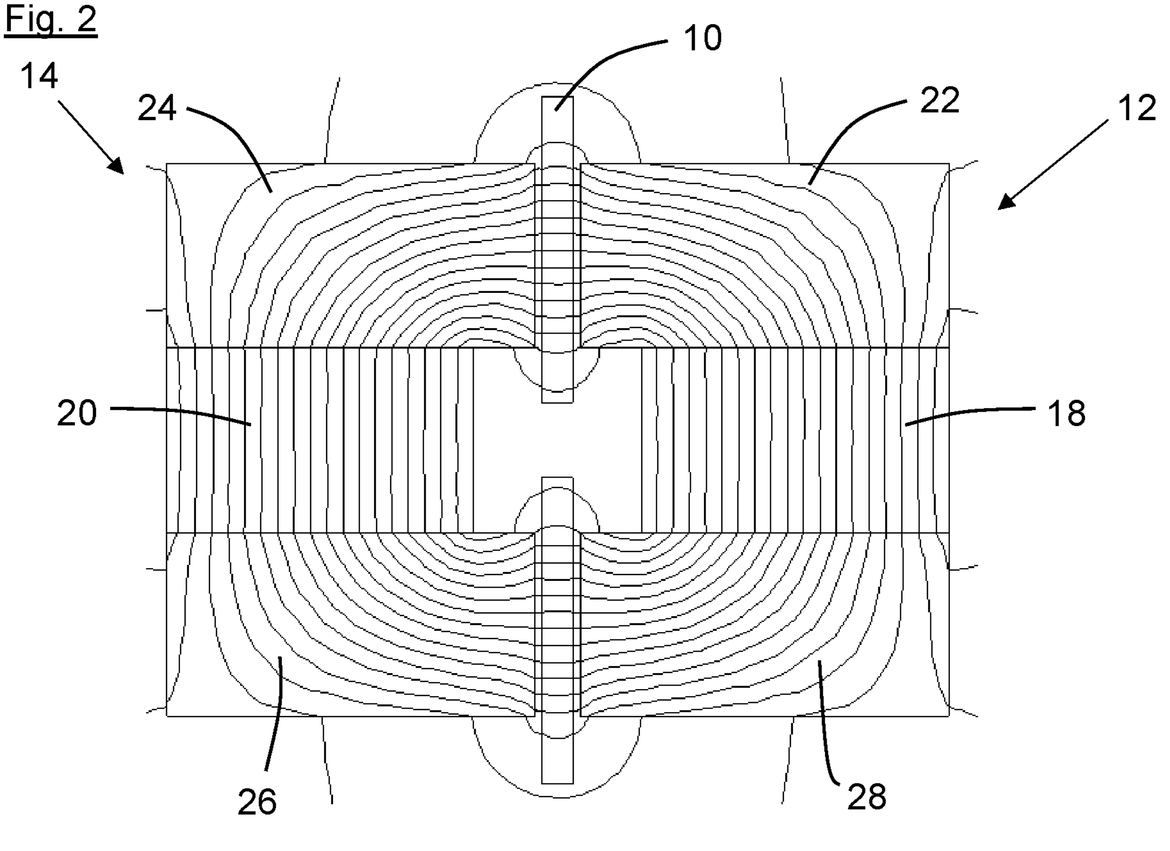
Figure 3:
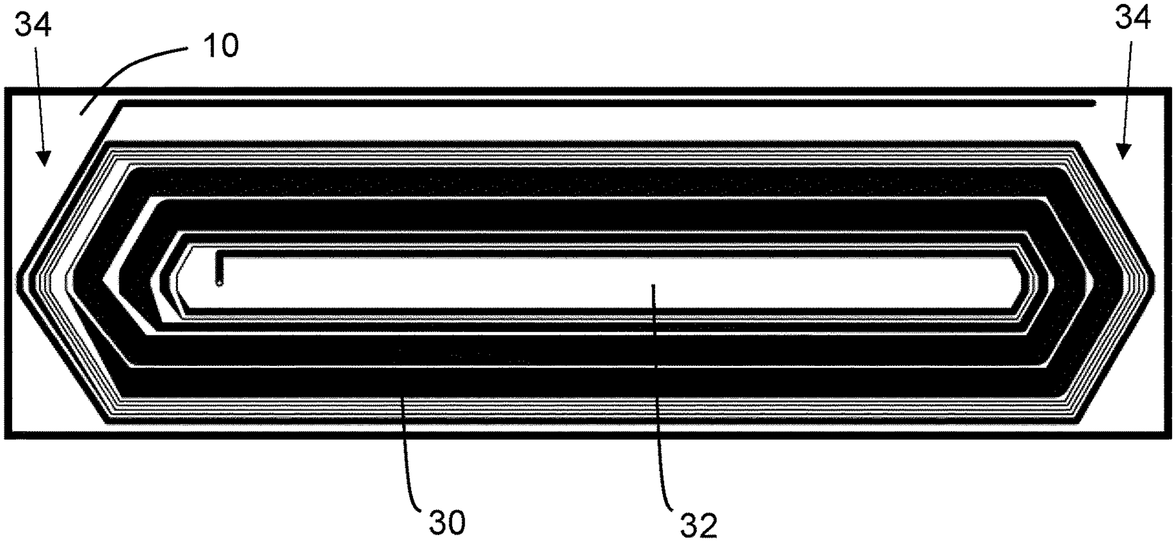
Figure 4:
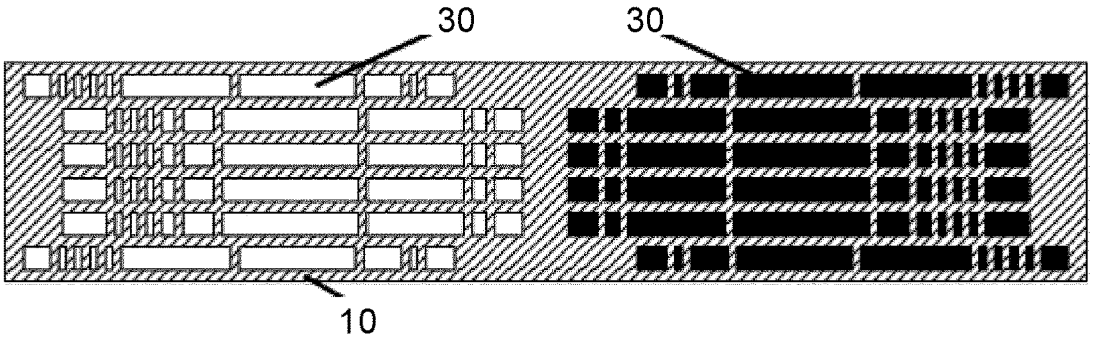
Figure 5:
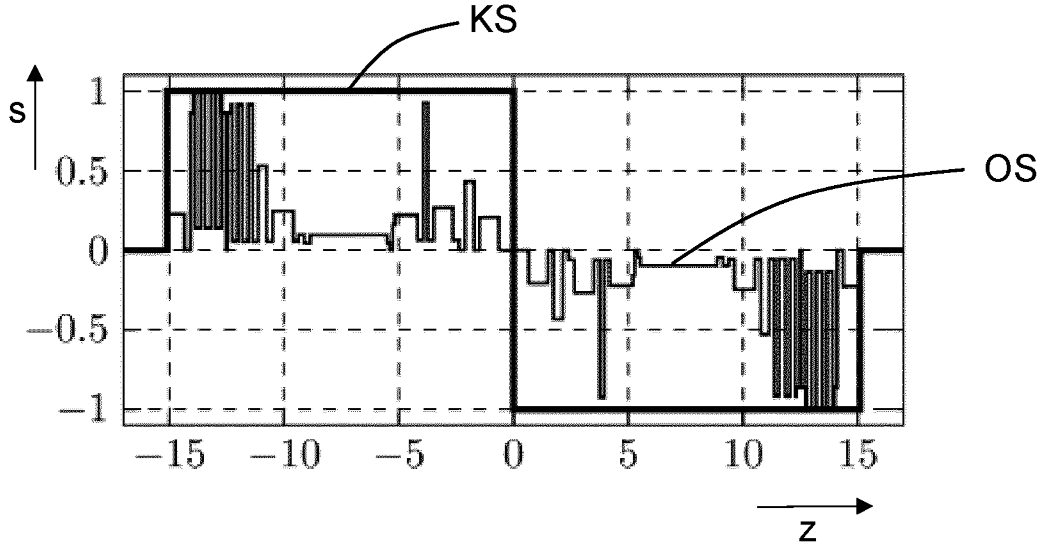
Figure 6:
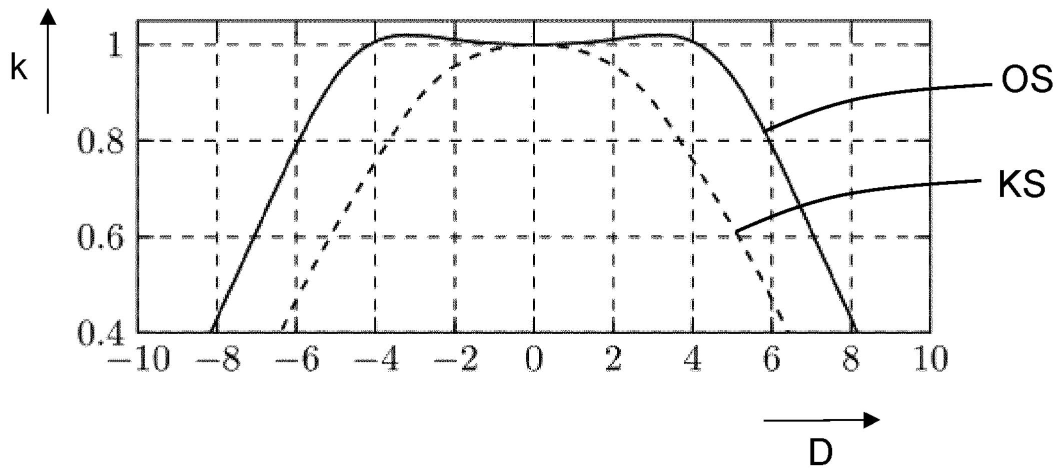

The invention is described below by way of example with reference to the drawings. The following is shown:

FIG. 1 a perspective view of one design of a coil in a magnet device according to the invention, FIG. 2 a sectional view of the design according to FIG. 1, FIG. 3 a top view of a design of a coil according to the invention, FIG. 4 a sectional view of a design of a coil according to the invention, FIG. 5 a diagram showing the normalised integral of the current density over the width and depth, FIG. 6 a diagram showing the force factor.

First of all, it should be noted that the designs shown are of a purely exemplary nature. Individual features can be realised not only in the combination shown, but also in a stand-alone position or in other technically sensible combinations. For example, the features of one design can be combined as desired with features of another design.

If a figure contains a reference sign that is not explained in the directly associated descriptive text, reference is made to the corresponding previous and/or subsequent explanations in the figure description. Thus, the same reference signs are used for identical and/or comparable components in the figures and these are not explained again.

FIG. 1 shows a coil with a printed circuit board 10, which is arranged in a gap between two magnet units 12, 14 of a magnet device 16.

Each magnet unit 12, 14 comprises a magnet 18, 20, e.g. bar magnets, and two pole pieces 22, 24, 26, 28, e.g. steel bars. For example, the magnets 18, 20 may comprise a neodymium alloy.

The coil together with the magnet device 16 forms a drive unit, for example for driving the sound panel of a loudspeaker.

When electricity flows through the coil, it is deflected in the magnetic field due to the Lorentz force. In this way, for example, a sound panel can be set in vibration.

FIG. 2 shows a corresponding sectional view in which the magnetic flow lines are drawn.

The magnets 18, 20 are aligned in such a way that circular magnetic flow lines result. The magnetic field strengths add up.

The pole pieces 22, 24, 26, 28 are arranged in such a way that the magnetic flow lines are concentrated in the gap in which the coil is located. The coil is only made of two parts for illustrative purposes. In fact, it is one-piece.

FIG. 3 shows a coil with a printed circuit board 10 and a large number of conductors 30.

Conductors 30, which are located in an inner area near the coil centre 32, have a smaller width than conductors 30, which are located in a central area.

The central area is followed from the inside to the outside by an outer area in which the conductors 30 again have a smaller width than the conductors 30 in the central area.

The conductors 30 can be V-shaped at lateral deflection areas 34, for example. The two legs can enclose an angle of 120°, for example. The corner areas can preferably be rounded to create a smooth transition.

The outer end of the conductors 30 may be connected to an amplifier. An applied electric current thus flows from the outside to the inside. The inner end of the conductors 30 can in turn lead to another layer. Preferably, several layers of coils are provided.

FIG. 4 shows a cross-section of an arrangement with several layers. The different colours represent the different directions of current.

The layers can be connected in parallel or in series. In particular, the conductors 30 of a layer are connected in series.

The widths of the conductors 30 can be different in the layers, at least partially.

FIG. 5 shows the integral of the current density over the width and depth for a coil with an optimised current density OS. The z-axis represents the height z of the coil in mm, while the s-axis corresponds to the normalised electric current $$\frac{\int_{x,y}\left|\vec{J}(z)\right|dxdy}{\max\left(\int_{x,y}\left|\vec{J}(z)\right|dxdy\right)}.$$

The centre of the coil was chosen as the origin of the Cartesian coordinate system. This is also the point of symmetry of the system.

The integral of the current density over the width and depth is the sum of the currents per height of all conductor cross-sections.

This is calculated from the integral of the current density over the x and y dimensions.

Only the z-axis can be considered here, as the magnetic flow density changes only minimally across the width of the coil and/or printed circuit board. Furthermore, the conductors are predominantly aligned perpendicular to the magnetic flow density over the depth. Compared to the corner areas, the conductors are very long, so that the corner areas can be neglected. There are therefore no changes over the length.

For positive values of the normalised current density, the result is approximately a U-shape. Accordingly, for negative values of the normalised current density, the result is approximately an inverted U-shape.

For comparison, the integral of the current density over the width and depth is shown for a coil with a constant current density KS, whereby the current density between the individual conductors is neglected.

In FIG. 6 the normalised force factor $$\frac{Bl}{Bl(D=0)}$$

is plotted along the k-axis against the coil deflection D in mm.

In a coil with an optimised current density OS, the normalised force factor is almost constant at 1 over a wide range, which is a significant improvement compared to a coil with a constant current density KS.

The range in the z-direction, in which the deviation is only a maximum of 10%, can extend from −5 mm to 5 mm, for example, in a coil with optimised current density OS according to the invention. In a conventional coil with constant current density KS, the corresponding range can be significantly smaller and extend, for example, only from −3 mm to 3 mm.

LIST OF REFERENCE SIGNS

10 printed circuit board
12, 14 magnet unit
16 magnet device
18, 20 magnet
22, 24, 26, 28 pole piece
30 conductor
32 coil centre
34 deflection area
OS optimised current density
KS constant current density
z z-axis
s s-axis
k k-axis
D coil deflection

The invention claimed is:

1. A coil, comprising
a printed circuit board (10), and
at least two windings formed as conductors (30), wherein the conductors (30) have different widths, wherein
that the widths of the conductors (30) are selected in such a way that the force factor of the coil is linearised in a magnetic field.

2. Coil according to claim 1,
characterized in
that a plurality of conductors (30) is provided, whereby the widths of the conductors vary unevenly from a coil centre (32) outwardly.

3. Coil according to claim 2,
characterized in
that the widths of the conductors (30) are smaller at an inner region than at a central region, the inner region being arranged closer to the coil centre (32) than the central region.

4. Coil according to claim 2,
characterized in that the widths of the conductors (30) are smaller at an outer region than at a central region, the central region being arranged closer to the coil centre (32) than the outer region.

5. Coil according to claim 1,
characterized in
that several layers of printed circuit boards (30) are provided.

6. Coil according to claim 1,
characterized in
in that the widths of the conductors (30) are selected in such a way that, in a magnetic field, a range of the deflection of the coil in which the quotient of a force factor and a force factor at a zero deflection deviates from the value 1 at most by a predetermined relative deviation is greater than in the case of a coil with constant widths of the conductors.

7. Use of a coil according to claim 1 for a loudspeaker.

8. Procedure of producing a coil according to claim 1,
in which
at least two windings of different widths in the form of conductors (30) are applied to a printed circuit board (10).

9. Procedure according to claim 8,
characterized in
that a computer-aided optimisation method is used to calculate the widths of the conductors (30).

10. Coil according to claim 1,
characterized in
that the coil is designed for driving a loudspeaker.

11. Use of a coil according to claim 1 for a planar loudspeaker.

12. Procedure according to claim 9,
characterized in
that the widths are optimised by linearising a force factor of the coil in a magnetic field.

* * * * *